Patented Oct. 29, 1940

2,219,895

UNITED STATES PATENT OFFICE 2,219,895

LUMINESCENT GLASS

Walter Hänlein, Berlin-Haselhorst, Germany, assignor to General Electric Company, a corporation of New York No Drawing. Application April 19, 1939, Serial No. 268,808. In Germany May 5, 1938

9 Claims. (Cl. 250—81)

My invention relates to luminescent glasses which emit light under the influence of short-wave rays, such as ultra-violet rays and also electron rays, and which can be employed for lamp bulbs, covering vessels, light screens, etc., for electric discharge lamps or devices. More particularly my invention relates to luminescent glasses of the translucent type, and to a method of manufacturing the same.

It is known to provide luminescent glasses with means for making them translucent in order to increase the intensity of the luminescent radiation. The increase in the luminescence is claimed to be caused by the fact that the primary or exciting rays which pass through the glass are caused, by the translucent particles, to traverse a longer path and thereby excite to an increased extent the luminescent materials dissolved in the glass. Simultaneously, radiation losses which the luminescent light suffers as it leaves the surface of the glass envelope, because of a partial total reflection at the boundary surface glass to air, are avoided by making the glass translucent. As a means for making the glass translucent, the means customary in the glass industry may be utilized, such as fluorides and phosphates which first go into solution together with the other glass constituents when the glass melts and which are thereafter segregated, by the subsequent heat treatment or tempering operation which the glass is subjected to upon the completion of the melting process. These segregated materials, in the form of for instance alkali or earth alkali fluorides or phosphates, constitute the particles within the solidifying glass masses which render them translucent. In addition to making the glass translucent by the above-mentioned fluorides and phosphates, it is possible, with a suitable composition and a corresponding heat treatment of the glass, to obtain a translucent character by compounds of glass components that are crystallized out, such as alkali metasilicates, aluminates, etc. However, where such a method is employed to produce the translucence in translucent luminescent glasses, the luminescent material itself always occurs in the dissolved state, usually in the form of compounds which may not produce any luminescence at all.

One object of my invention is to provide a translucent luminescent glass which will produce luminescent radiation of increased intensity over that heretofore obtainable, when excited by short wave radiations.

Another object of my invention is to provide a translucent luminescent glass in which the components producing translucence consist of luminous materials which are present in the glass itself and which are segregated into the crystalline or microcrystalline form.

Still another object of my invention is to provide a translucent luminescent glass containing luminescent material which will produce luminescent radiation of the same spectral distribution and to the same extent as that produced by the said luminescent material when it exists in the free state.

A further object of my invention is to provide a method for the manufacture of translucent luminescent glass having the luminescent material therein segregated in crystalline form and producing the translucence in said glass.

Further objects and advantages of my invention will appear from the following detailed description of a species thereof.

The present invention is based on the knowledge that the intensity of the luminescent radiation in translucent luminescent glasses can be considerably increased when the components which render the glass translucent consist of luminous materials which are present in the glass and which are segregated by the subsequent heat treatment or tempering operation. The increase in the luminescent emission in this case may be mainly caused by the fact that the luminescent materials are changed by the segregation into the crystalline or microcrystalline form, while, in addition, the previously described advantages of the effect created by rendering the glass translucent are also retained.

The glasses according to the invention are particularly distinguished, in addition to their increased light emission, by the fact that they produce the same luminescent spectrum, and to the same extent, which the corresponding crystallized luminescent material produces in the free state, in other words, outside of a glass. In order to assure, during the heat treatment of the glass, that the luminescent materials which are first in solution in the glass (such as zinc or cadmium silicate or zinc-beryllium silicates with or without activating heavy metal additions) will be segregated in the desired form and not in the form of other compounds of the glass components which do not result in luminescent materials, the other glass components must be adjusted, as far as quantity is concerned, in a suitable manner with respect to each other and with respect to the quantity of the particular luminescent material that is used.

In order to attain the desired result, that is the sole or practically sole segregation of the luminous materials, it is necessary to avoid, in the manufacture of the glass, those glass constituents such as alkalies which themselves or in their compounds have a discharge or crystallization range which covers either entirely or partly that of the luminescent material, or such constituents must be used only in limited quantities.

A translucent, luminescent glass according to the invention may have, for instance, the following composition, the material for rendering the glass luminescent and translucent consisting, in this case, of zinc silicate:

|  | Per cent |
|---|---|
| $SiO_2$ | 57 |
| $Al_2O_3$ | 10 |
| ZnO | 29.5 |
| CaO | 1.5 |
| BaO | 1.5 |
| $MnO_2$ | 0.5 |

If the glass is to have a higher coefficient of expansion, which is required for instance when current supply wires consisting of tungsten or molybdenum are to be sealed in the glass, then the silica content may be slightly reduced, for instance to 55 per cent, and an addition of 2 per cent $Na_2O$ or $K_2O$ may be made. In this case a reduction of the intensity of fluorescence will occur which, however, is not noticeable.

When a glass according to the above composition is cooled in the customary way following the melting operation, then a glass is first produced which gives a faintly orange-colored fluorescence under the influence of ultraviolet rays. After a suitable tempering, however, preferably at a temperature of approximately 900–1000° C., a certain amount of translucence is formed and the subsequently solidified glass then shows, when it is primarily excited by such rays, an extremely intensive green fluorescence which, as shown by the spectrum, is identical with that of the crystalline pure zinc silicate. This then proves that actually the desired zinc silicate, and not some other arbitrary compound, has been crystallized out.

A characteristic feature of the new translucent glasses according to the invention is the low alkali content, or as shown in the example, the lack of any alkali content whatever. This absence of alkali content consequently prevents the crystallizing out of alkali silicates during the heat treatment, which alkali silicates would prevent the formation of zinc silicates. The danger that possible alumo-silicates may be segregated does not exist in the indicated composition since their deglassing range lies considerably higher than that of the zinc silicates.

The new luminescent, translucent glasses are excellent for electric discharge lamps, particularly metal-vapor discharge lamps of various types now well known in the art, such as the low pressure mercury discharge lamps.

What I claim as new and desire to secure by Letters Patent of the United States is:

1. A translucent, luminescent glass in which the components rendering the glass translucent consist of luminescent materials segregated out in the crystalline form, the glass being substantially free from alkalies.

2. A translucent, luminescent glass in which the component rendering the glass translucent consists of a luminescent silicate segregated out in the crystalline form, the glass being substantially free from constituents which have a crystallization range coinciding with that of the luminescent component.

3. A translucent, luminescent glass in which the component rendering the glass translucent consists of luminescent zinc-silicate segregated out in the crystalline form, the glass being substantially free from constituents which have a crystallization range coinciding with that of the luminescent component.

4. A translucent, luminescent glass in which the component rendering the glass luminescent consists of a luminescent material segregated out in crystalline form, said glass being substantially free of those constituents which have a deglassing range within the deglassing range of said luminescent material.

5. The method of manufacturing a translucent luminescent glass which comprises including in the glass batch components capable of being dissolved in the glass and then segregated by a subsequent heat treatment to render the glass luminescent and translucent, and avoiding substantial quantities of components having a deglassing range coinciding with that of the said luminescent components, melting the batch to dissolve all the components thereof, and then, after solidification, subjecting the glass to a heat treatment to cause segregation of only the said luminescent components.

6. A translucent, luminescent glass composition in which the component rendering the glass translucent consists of a luminescent material segregated out in crystalline form, the said luminescent material being formed from constituents constituting the major portion of the glass composition and the said glass composition being substantially free from constituents which have a crystallization range coinciding with that of the luminescent component.

7. A translucent, luminescent glass composition containing as major constituents silica and an oxide of a metal which forms therewith a luminescent silicate, the said luminescent silicate of said metal being segregated out in crystalline form and rendering the glass translucent, the said glass composition being substantially free from constituents which have a crystallization range coinciding with that of the luminescent silicate.

8. A translucent, luminescent glass composition containing as major constituents silica and zinc oxide in the proportions of approximately two parts silica to one part zinc oxide, said constituents forming in the glass composition a luminescent silicate of zinc which is segregated out in crystalline form and renders the glass translucent, the said glass composition being substantially free from constituents which have a crystallization range coinciding with that of the luminescent silicate of zinc.

9. A translucent, luminescent glass having approximately the following composition:

|  | Per cent |
|---|---|
| $SiO_2$ | 57 |
| $Al_2O_3$ | 10 |
| ZnO | 29.5 |
| CaO | 1.5 |
| BaO | 1.5 |
| $MnO_2$ | .5 | and having zinc silicate segregated out in crystalline form so that the glass exhibits an intensive green fluorescence when exposed to exciting radiations.

WALTER HÄNLEIN.